(12) United States Patent
Elliott et al.

(10) Patent No.: US 10,117,117 B2
(45) Date of Patent: Oct. 30, 2018

(54) RESTORATION OF NETWORK ACCESS

(71) Applicant: BRITISH TELECOMMUNICATIONS PUBLIC LIMITED COMPANY, London (GB)

(72) Inventors: David Elliott, London (GB); Craig Mulvaney, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 15/550,489

(22) PCT Filed: Jan. 26, 2016

(86) PCT No.: PCT/EP2016/051559
§ 371 (c)(1),
(2) Date: Aug. 11, 2017

(87) PCT Pub. No.: WO2016/128211
PCT Pub. Date: Aug. 18, 2016

(65) Prior Publication Data
US 2018/0027433 A1 Jan. 25, 2018

(30) Foreign Application Priority Data
Feb. 13, 2015 (EP) .................................... 15275032

(51) Int. Cl.
*G01R 31/08* (2006.01)
*H04W 24/04* (2009.01)
(Continued)

(52) U.S. Cl.
CPC ............. *H04W 24/04* (2013.01); *H04W 4/06* (2013.01); *H04W 76/15* (2018.02); *H04W 76/18* (2018.02); *H04W 84/12* (2013.01); *H04W 88/06* (2013.01)

(58) Field of Classification Search
CPC ....................................................... H04W 24/04
(Continued)

(56) References Cited

U.S. PATENT DOCUMENTS

2009/0213730 A1 8/2009 Zeng et al.
2010/0260146 A1* 10/2010 Lu ....................... H04L 12/4633
370/331
2013/0107783 A1 5/2013 Shaw

FOREIGN PATENT DOCUMENTS

EP         1 562 390      8/2005
WO    WO 2014/083296    6/2014

OTHER PUBLICATIONS

International Search Report for PCT/EP2016/051559, dated Apr. 21, 2016, 3 pages.
(Continued)

*Primary Examiner* — Samina Choudhry
(74) *Attorney, Agent, or Firm* — Nixon & Vanderhye P.C.

(57) ABSTRACT

A wireless-enabled user terminal (7) is configured to detect the absence of a connection (3) between a wireless network router (1) and a core network (2). The terminal (7) uses data by which the router (1) is identified to emulate the router (1) and set up an alternative link (8, 9) to the network (2) so that other terminals (4, 5, 6) previously connecting to the network (2) through the router (1) can continue to connect to the network (2) through the terminal (7) and alternative link (8, 9) using the same network identities as they did through the router (1) until a connection (3) between the router (1) and network (2) is installed or restored.

20 Claims, 4 Drawing Sheets

(51) Int. Cl.
  *H04W 4/06* (2009.01)
  *H04W 76/18* (2018.01)
  *H04W 76/15* (2018.01)
  *H04W 88/06* (2009.01)
  *H04W 84/12* (2009.01)

(58) Field of Classification Search
  USPC .......................................................... 370/216
  See application file for complete search history.

(56) References Cited

OTHER PUBLICATIONS

International Preliminary Report on Patentability with Amended Sheets, dated Feb. 2, 2017, 13 pages.
AVM. FRITZ! Box 7390 Service, https://web.archive.org/web/20141129123734/http://avm.de/nc/service/fritzbox/fritzbox-7390/wissensdatenbank/publication/show/76_FRITZ-Box-fuer-Internetzugang-ueber-Mobilfunk-einrichten, Nov. 29, 2014, pp. 1-2, XP002743031.

* cited by examiner

RESTORATION OF NETWORK ACCESS

This application is the U.S. national phase of International Application No. PCT/EP2016/051559 filed 26 Jan. 2016, which designated the U.S. and claims priority to EP Patent Application No. 15275032.9 filed 13 Feb. 2015, the entire contents of each of which are hereby incorporated by reference.

BACKGROUND AND SUMMARY

This invention relates to connection of data terminals to a data network through wireless access points, and in particular to provision of access in the event of failure, or a delay in installation, of a primary connection between an access point and the data network.

Connection to data networks such as the Internet has become an integral part of many domestic and small business activities. Typically, one or more user terminals will connect to the public network through a local area network (LAN) controlled by a router, which mediates data messages between the user terminal and the Internet, including providing modem functions. Connection between the terminal and the router may be by an Ethernet or Powerline connection, but increasingly wireless connection is used (a Wireless LAN or WLAN) as this allows terminals to be placed anywhere within wireless range of the router.

Terminals connected to the same router may also communicate between each other through the router, without going through the external network. To provide privacy for such activity, and to ensure the router is not misused by unauthorised persons to gain access to the internet, routers typically have access protection to ensure only users with the correct access credentials can use them.

Failure of the primary connection between an access point and the network can be problematic as users have become reliant on their internet connections for many business and domestic purposes.

Many troubleshooting operations can be provided by information available on the Internet, but if it is the Internet connection itself which has failed that information is not accessible unless the user has had the foresight to download it in advance. Consequently, such failures account for a very high proportion of calls to network operators' helpdesks— and in some cases even that course of action is not available if the Internet connection is over the user's telephone line, as the failure is likely to have affected voice calls over the telephone line as well.

Recent proposals, such as the applicant's earlier patent applications WO2014/083295 and WO2014/083296 allow a wireless router to establish wireless connection with another wireless router nearby, which has a public open-access facility and is still connected to the internet, allowing internet traffic to be relayed between the routers. However, there are many circumstances when this may not be practical, for example if no public-access wireless router is within range, or the fixed backhaul connection failure has affected the whole area, including any neighbouring routers within wireless range.

The present invention provides an alternative process to allow establishment of connection between the user and the data network in the absence of a connection through the primary (fixed) network.

According to the present invention, there is provided a process for operation by a wireless communications device, the process comprising the steps of:

receiving a signal from a local area network router to which the wireless communications device is currently wirelessly connected, indicative that the local area network router has detected absence of a primary backhaul connection to a data network, identifying a wireless configuration identity of the router through which it identifies itself to the wireless communications device setting up a network identity for the wireless communications device replicating the wireless configuration identity of the router establishing a wireless secondary backhaul connection to the data network independent of the router operating as a secondary access point to route data traffic between other wireless communication devices and the data network using the wireless configuration identity obtained from the router The wireless communications device, on detection that the local area network router has no primary backhaul connection, can then transmit a shutdown signal to the local area network router to cause the local area network router to suspend transmitting its wireless configuration identity. This detection may be in response to a signal from the router indicative of loss of the backhaul connection, or to an inability to connect to a backhaul connection through the router. The shutdown signal can be used to cause the local area network router to suspend transmission of its wireless configuration identity until it detects a backhaul connection, and then to resume transmission of its wireless configuration identity. The local area network router may be arranged to only respond to the shutdown signal if it detects that the wireless communications device has an identity previously recorded by the local area network router as authorised to operate in connection with the router.

On detecting a recovery signal from the local area network router indicative that a primary backhaul connection has become available through the local area network router, the wireless communications device that has been operating as a second network access point can shut that function down and cease to broadcast the replicated wireless configuration identity.

The wireless communications device may generate an indication on a user interface that it is operating as a secondary network access point, and may first generate a prompt in response to the signal from the first access device indicative of a loss of backhaul connection, requiring a user input before initiating operation as a second access point.

The wireless communications device may transmit redirection data to the data network to cause data addressed to the wireless communications device and any other data processing devices previously connected to the local area network router to be redirected by way of the secondary network. On detection of the recovery signal, the wireless communications device may then transmit further redirection data to the data network to reverse the redirection instructions such that data addressed to the wireless communications device and any other data processing devices previously connected to the local area network router is transmitted by way of the primary backhaul network and the local area network router.

The invention also provides a wireless communications device, having means for wireless communication with a data network through a local area network router connected to a primary backhaul connection, and means for communication with the data network through a second access point and a secondary network connection, the wireless communications device having a store for wireless configuration identity data received from a local area network router, and for broadcasting the wireless configuration identity data for detection by other wireless-enabled devices in the event of loss of the primary connection, the wireless communications device being operable both as a user terminal and to emulate the local area network router to allow other devices previously connected to the data network through the primary backhaul connection through the local area network router to make connection to the data network through the wireless communications device and the secondary connection.

The device may be arranged to respond to a signal indicating that the local area network router has no backhaul connection, by transmitting a shutdown signal to the local area network router to cause the local area network router to suspend transmitting its wireless configuration identity, and to respond to a recovery signal from the local area network router indicative that a primary backhaul connection is available through the local area network router, by shutting down its operation as a second network access point and ceasing to broadcast the duplicated wireless configuration identity.

The wireless communications device may be arranged to generate an indication on a user interface that it is operating as a second network access point, and may generate a prompt on the user interface in response to a signal from the first access device indicative of a loss of backhaul connection, operation as a second access point being initiated in response to a user input following the prompt.

The wireless communications device may be arranged to generate redirection data to cause data addressed to the wireless communications device and any other data processing devices previously connected to the local area network router to be redirected, and to transmit the redirection data to the data network.

The wireless communications device can therefore become a "clone" of the router, and act as a surrogate for it, so that that traffic between other terminals and the backhaul network can be routed through the device using a wireless connection such as a "4G" cellular connection. This allows continuity of service when a fixed backhaul connection has failed, or if there is a delay in installing one to customer premises, and in particular can access troubleshooting websites to help get the customer reconnected. The invention can be pre-installed as an application on the user terminal, which may be a dual-mode (Wifi/4g) internet-enabled "smartphone".

BRIEF DESCRIPTION OF THE DRAWINGS

An embodiment of the invention will now be described with reference to the drawings in which.

DETAILED DESCRIPTION OF PRESENT EXAMPLE EMBODIMENTS

Figure 1:
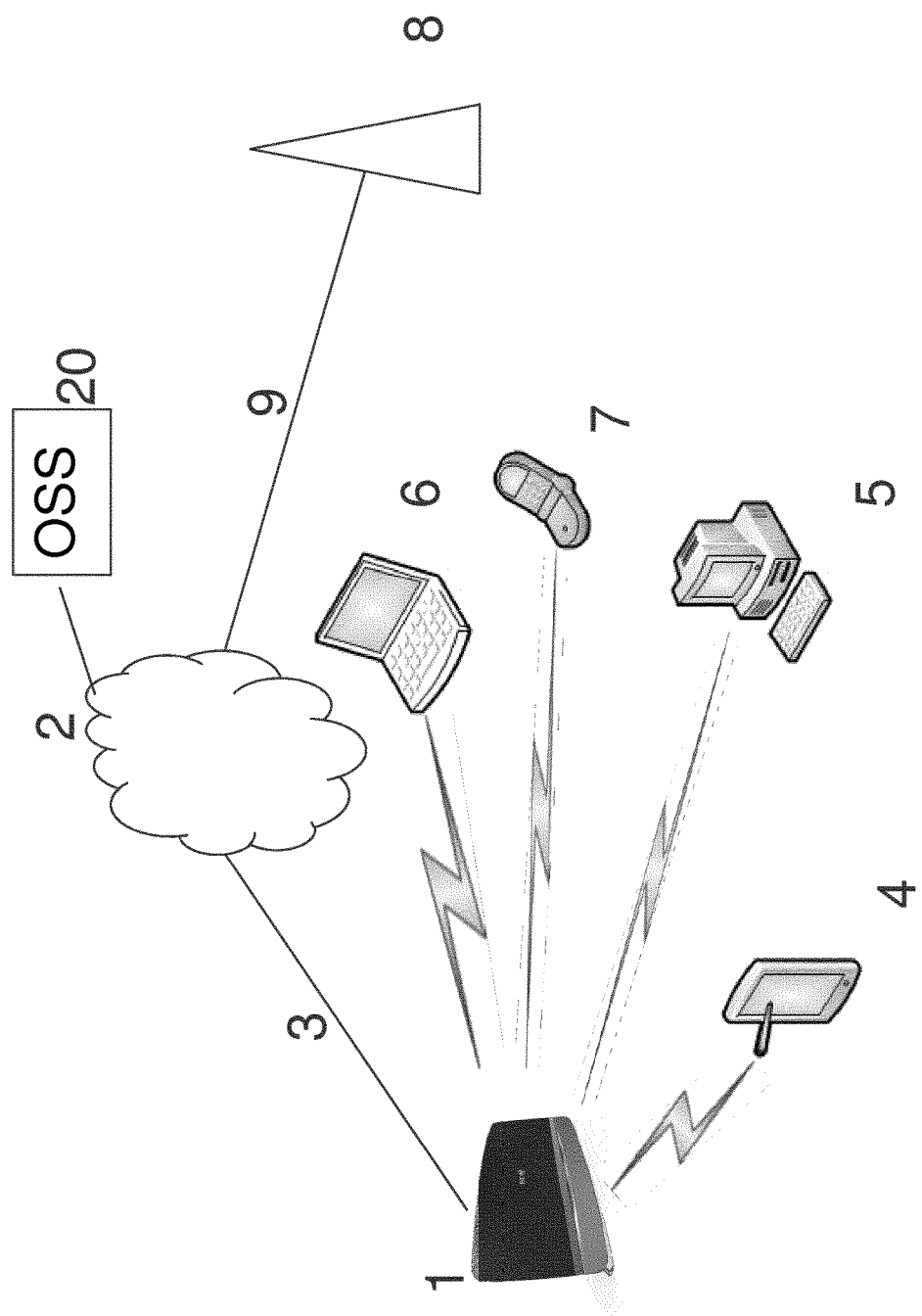
FIG. 1 illustrates a typical wireless LAN in which the embodiment may be implemented

FIG. 1 depicts a local area network comprising a router 1, connected to a data network 2 by a fixed-line connection 3, and providing wireless connection to a number of devices 4, 5, 6 7, of which one wireless device 7 also has a separate wireless connection capability to communicate with a base station 8 of a public network 9 through which it is also possible to communicate with the data network 2. Associated with the network 2 is an operating system 20 controlling routing of data within the network 2.

In this illustrative example the process of this embodiment is performed in response to the failure of an existing fixed line connection, but it will be understood that it can also be used in circumstances where a fixed-line connection 3 has yet to be installed.

Figure 2:
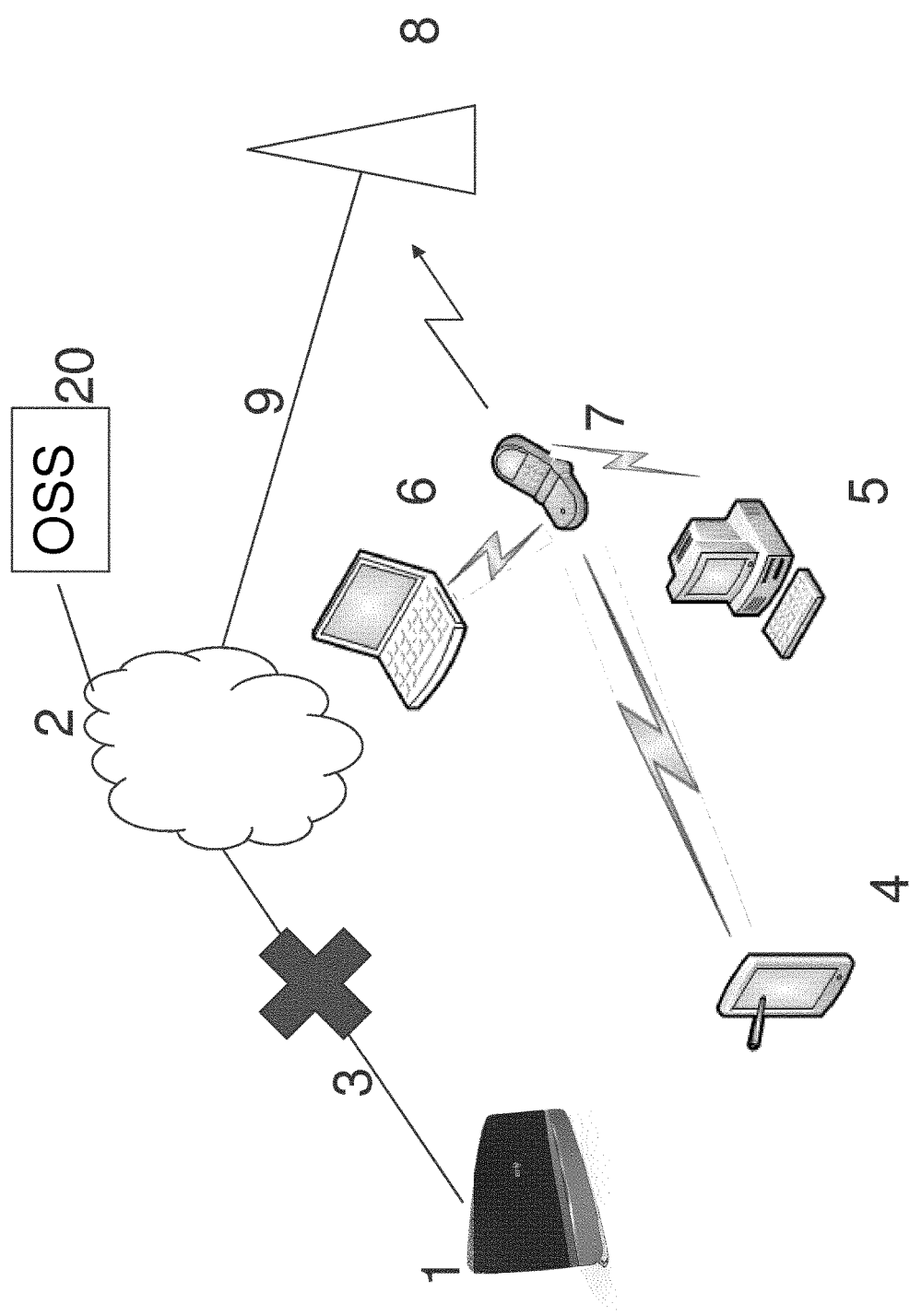
FIG. 2 illustrates the wireless LAN after the process of the embodiment has been carried out

FIG. 2 illustrates the same local area network after it has been reconfigured according to the process of this embodiment such that the router 1, having detected the absence of a backhaul connection 3, has been replaced by dual-function wireless device 7, operating through the wireless network base station 8 and network 9 as the means by which the other devices 4, 5, 6 can communicate with the data network 2.

Figure 3:
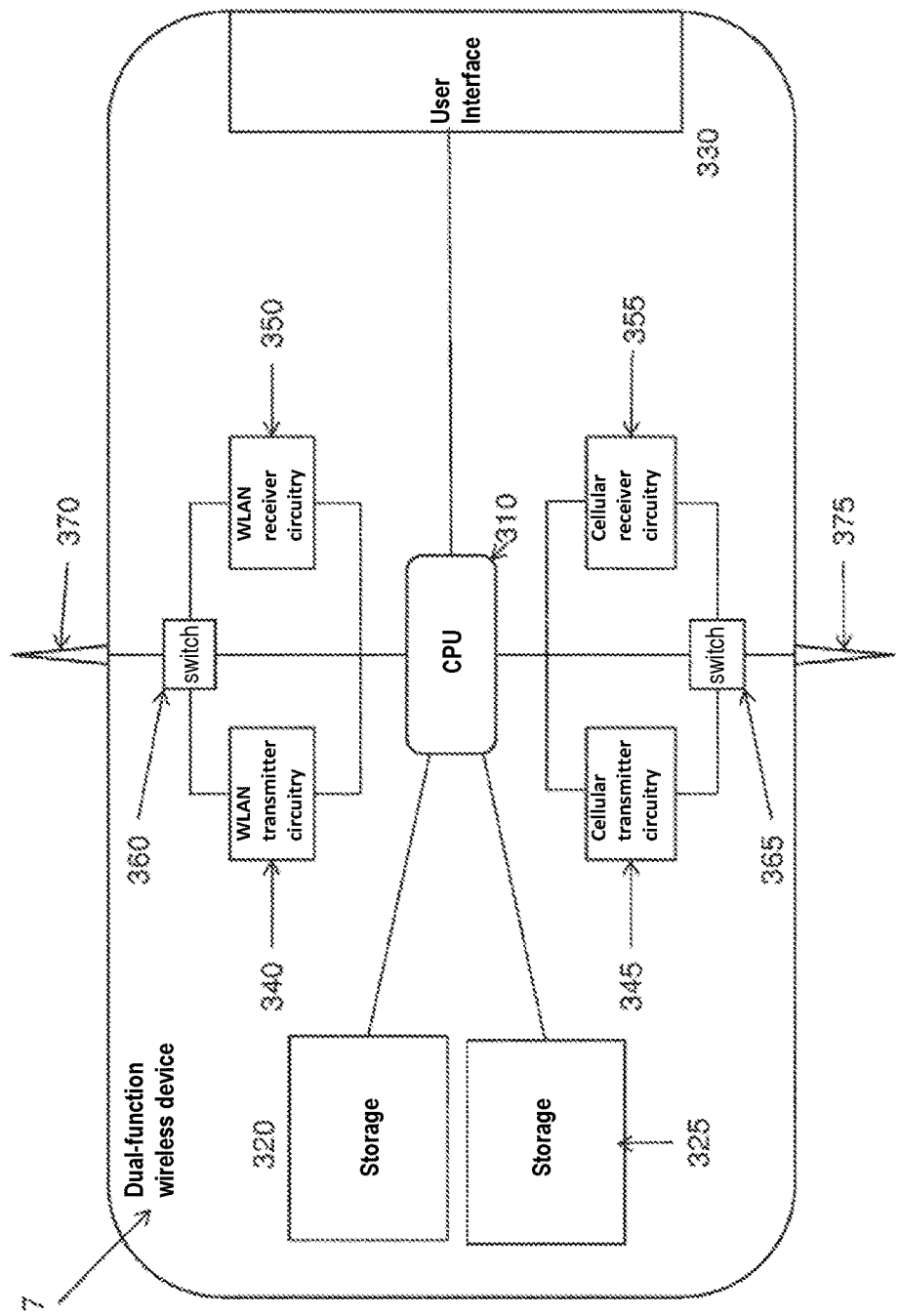
FIG. 3 illustrates the relevant functional elements of a wireless device in which the embodiment may be installed

FIG. 3 shows a schematic depiction of a user terminal 7 operating according to the present invention which comprises a central processing unit (CPU) 310, volatile data storage means 320, non-volatile data storage means 325, WLAN transmitter circuitry 340, WLAN receiver circuitry 350, a WLAN transmitter-receiver switch 360 and a WLAN antenna 370, cellular transmitter circuitry 345, cellular receiver circuitry 355, cellular transmitter-receiver switch 365 and a cellular communications antenna 375. In operation, the CPU will execute code stored within the non-volatile data storage means and will hold data in the volatile data storage means. In normal use the wireless user terminal 7 is able to communicate with one or more other devices 4, 5, 6, and with the data network 2, via the WLAN antenna 370 and a router 1. It also has a capability to communicate using the cellular antenna 375 with a cellular communications network 9 through a base station 8.

It will be understood that FIG. 3 depicts the functional components of the terminal 7. They may be physically embodied in one or more components, and certain components may embody multiple functions: for example a single antenna may be used for both WLAN and cellular communications. Other functions, such as audio transducers (microphones, earphones) and analogue/digital coder/decoders, a control panel and display screen may be embodied in the device 7 so that it can also function as a conventional cellular telephone, tablet computer or other device. These components are depicted generally as a user interface 330.

Figure 4:
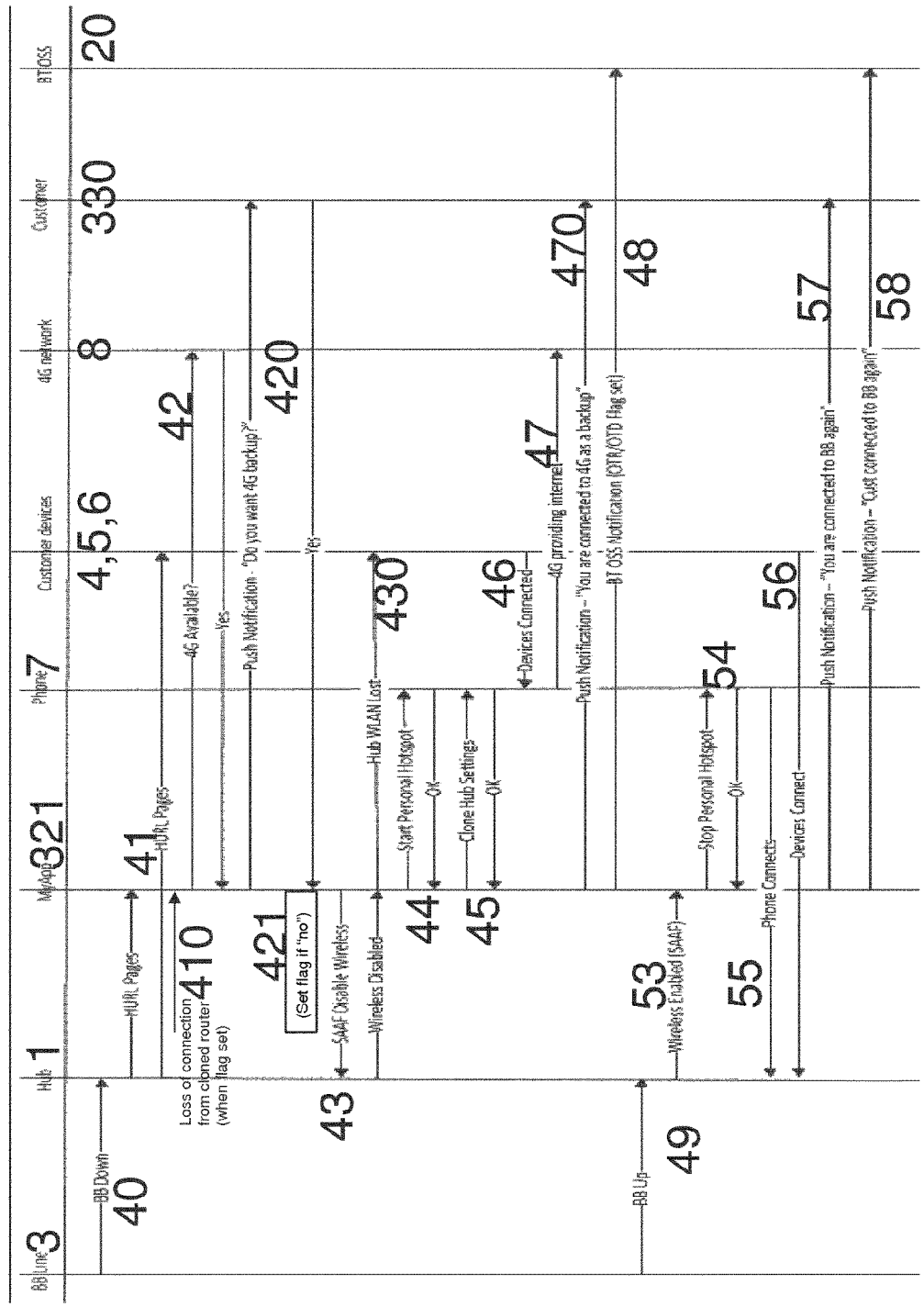
FIG. 4 is a flow diagram illustrating the process of the embodiment to the invention.

FIG. 4 is a sequence diagram illustrating the process of this embodiment. For illustrative purposes the router 1 is shown to be initially connected, and the user terminal 7 has already installed the capability to operate the process as an application 321 in the memory 320. If the latter is not the case, the capability can be downloaded as an application for programming the device 7 by way of the public network 8 and base station 9 when it is required.

The process depicted in FIG. 4 begins with the network configured as shown in FIG. 1, in which the wireless router 1 operates as the controlling element of a wireless LAN to which devices 4, 5, 6, 7 are connected wirelessly, so that they can communicate with each other (for example to share data, or to send data to a printer also connected to the LAN) and can also connect to the Internet 2 through a fixed-line backhaul connection 3, if such a connection is available.

The process of FIG. 4 is initiated when the router 1 detects that no backhaul connection 3 is available (step 40). This may be because such a connection has failed, or it may be because the router 1 has been connected to an inactive line, as may occur for example if a user moves into new premises before the backhaul connection 3 is activated.

When a typical router 1 has no internet connection it transmits a message known as a HURL page to any device 4, 5, 6, 7 which are connected to it, or subsequently attempt to connect to it. In the user device 7 of this embodiment the application 321 responds to the HURL message by seeking to connect to an alternative network (step 42). Alternatively the application 321 may seek an alternative network when it detects that the user device 7 has been allocated a LAN IP address leased from a network router 1, but is unable to connect through that router to a wide area network 2. In this example the device is a "4G"-enabled "smartphone" and thus seeks a beacon signal from a base station 8 of such a network.

Connection may be automatic, or a confirmation may be sought (step 420) from the user 330 before proceeding. This enables the user to select whether to use the backup service. He may wish to decline if, for example, he is not connected to his "home" cellular network and wishes to avoid roaming charges. It also allows a user to choose which of two or more devices enabled with this capability is to act as the temporary router. If there are devices that are connected to the router 1 other than by wireless (for example by Ethernet or power line) with which it is desired that the wireless devices 4, 5, 6, 7 continue to communicate, the user may prefer to continue to user the router 1, notwithstanding that the LAN would then be isolated from the Internet until the backhaul connection is available.

The router 1 may be arranged to only relinquish control of the SSID if the MAC address of the device 7 requesting control of the SSID is that of a device which has previously successfully connected to it, and therefore can be assumed to be under the control of a person who has the password for that WLAN. Alternatively, the router may be arranged to require a specific input from an authorised user before proceeding. This may be useful for example if a router has two password-protected SSIDs for the use of different categories of user (e.g staff and guest) but it is desired that the guest SSID can only be taken over by a user with "staff" authority.

In the next step (43) user terminal 7, under the control of the application 321, transmits an instruction to the router 1 to disable the router's wireless capability. This instruction causes the wireless capability of the router 1 to remain offline until it detects a signal (49) on the backhaul connection. The devices 4,5,6,7 will then all detect the loss of wireless connection to the router.

Once the application 321 in the user device 7 detects that the router has responded to its command 43 to disable its wireless connection, it turns on its built-in Hotspot capability (step 44). Many "smartphones" have such a capability built-in, or it can be installed as part of the application 321. This capability allows a dual mode Wifi/cellular telephone to operate as a wireless base station to which other wifi enabled devices may connect. In normal use, the other devices would need to each handover and provide authentication in order to use this hotspot. This can be cumbersome, and also would not allow the devices to automatically return to their original resident hub when it becomes available. The present embodiment overcomes this problem, by allowing the user device 7 which is to operate as the hotspot to copy the SSID (service set identifier) by which the router 1 identifies itself, and the password which is used by devices to identify themselves to the router. Both the SSID and password can be retrieved from the memory 325 in the device 7, where they will have been stored when the device 7 was first connected to the router 1.

The application 321 then uses the router's wireless settings to set up the hotspot (step 45) and transmit a beacon having the same characteristics as the beacon associated with the router 1. The other devices 4, 5, 6 will not detect any change as the identity, (SSID), beacon, and log-in protocols used by the user device 7 are the same as those which were in use by the router 1, so the other wireless devices 4, 5, 6 detect this device 7 and reconnect to it (step 46) allowing them to resume connection to the data network 1 (step 47) after a brief interruption (between steps 40-47) without any need for their users to reconnect, or use any different log-in details. The other wireless devices 4, 5, 6 interact with the device 7 exactly as if it were the router 1, and can connect to the data network 1, and to each other in exactly the same way as before.

Typically the mobile data connection 8, 9 may have a lower data capacity than the fixed link 3, so the users may detect a slower service.

The application 321 provides a message to the user interface 330 to indicate that the connection is now being made through the cellular connection 8, 9. This message may also indicate any limitations on the capabilities of this link, and an indication that the link between the data network 2 and the other devices 4, 5, 6 may be lost if the device 7 is switched off or moved out of their range.

When the device 7 connects to the network 2 through the connection 8, 9, its IP networking software generates a routing instruction 48 to be transmitted to the network operating system 20 to update addressing information such that data addressed to travel over the link 3 and router 1 is instead routed over the link 9, 8 and user device 7, whilst substituting for the router 1.

When the router 1 detects that its connection 3 to the network 2 is restored (or established) (step 49) it re-enables its wireless SSID (step 53) and starts to transmit its SSID. The application 321, on detecting the SSID of the router it is substituting for, disables its wireless hotspot (step 54), and reconnects to the router 1 (step 55). The restored SSID and log in protocols used by the router 1 are the same as those which have been used by the user device 7 whilst the router was off line, and so any other devices 4, 5, 6 continuing to use the SSID will once again connect to the router 1 (step 56) without any action required by their users.

The user 330 is informed by the application 321 that the backhaul link is in use again, and consequently the device 7 is no longer acting as a hotspot and can be switched off or taken out of range. Finally, the application 321 generates a message (step 58) to be sent (by way of the router 1) to the network operating system 20, to indicate that the diversion previously set up (step 48) can be cancelled and data destined for the devices 4,5,6,7 is once again to be transmitted by way of the connection 3 and router 1.

The application may be provided with a capability for several user devices (e.g 6, 7), if they all have the same application 321 installed, to co-operate such that if a first user device acting as a surrogate for the router 1 is removed from the local network, for example because its owner has taken it off the premises, or it has run out of power, a second device 6 can take over from it. To achieve this, the application is arranged such that when such a user device 7 is operating as a clone of the router 1, it broadcasts a signal which is recognisable to any other user device 6 which has the same application 321 installed, so that the other user device 6 can flag the identification data for the router (which it stored when it first connected to the router 1 or the first user device 7) as relating to a surrogate 7 rather than the router 1 (step 421). If the second user device 6 subsequently loses contact with the user device 7 (and the router has not resumed operation) 7 (step 410), the second user device 6 starts the process depicted in FIG. 4, the flag indicating that it should omit the interactions 41, 43 with the router. Thus after checking that the device is still in range of a cellular connection (step 42) and that the user wants to switch to this device 6 (step 420)—there may, again be more than one device in range with this capability, or it may be that the second device 6, and not the first device 7, has been taken off the premises—the second user device sets up a personal hotspot (step 44) and follows the rest of the procedure 45-48. Thus, if the original device 7 is no longer in range, another device 6 with the same application 321 pre-stored within that device can act as a secondary backup if such a device is still available in range.

The invention claimed is:

1. A process for operation by a wireless communications device, the process comprising the steps of:
   receiving a signal from a local area network router to which the wireless communications device is currently wirelessly connected, indicative that the local area network router has detected absence of a primary backhaul connection to a data network;
   retrieving a wireless configuration identity through which the router identifies itself to the wireless communications device;
   broadcasting a wireless configuration identity for the wireless communications device replicating the wireless configuration identity of the router;
   establishing a wireless secondary backhaul connection to the data network independent of the router; and
   operating as a secondary access point to route data traffic between other wireless communication devices and the data network through a second access point and a secondary network connection, using the replicated wireless configuration identity.

2. A process according to claim 1, wherein absence of a primary backhaul connection is detected by the router and a message indicative of that absence is transmitted to the wireless communications device by the router.

3. A process according to claim 1, wherein absence of a primary backhaul connection is detected by the wireless communications device detecting a condition in which it has an address allocated by the router but is unable to connection to a wide area data network through the router.

4. A process according to claim 1 wherein the wireless communications device, on detection that the local area network router has no primary backhaul connection, transmits a shutdown signal to the local area network router to cause the local area network router to suspend transmitting its wireless configuration identity.

5. A process according to claim 4, wherein the local area network router is only responsive to the shutdown signal if it detects that the wireless communications device has an identity previously recorded by the local area network router as authorised to operate in connection with the router.

6. A process according to claim 4 wherein the wireless communications device, on detecting that a primary backhaul connection is available through the local area network router, shuts down its operation as a second network access point and ceases to broadcast the replicated wireless configuration identity.

7. A process according to claim 4, wherein the shutdown signal causes the local area network router to suspend transmission of its wireless configuration identity until it detects a backhaul connection, and then to resume transmission of its wireless configuration identity.

8. A process according to claim 1, wherein the wireless communications device generates an indication on a user interface that it is operating as a secondary network access point.

9. A process according to claim 8, wherein the operation as a second access point is initiated in response to a user input, following a prompt generated by the device in response to the signal from the first access device indicative of a loss of backhaul connection.

10. A process according to claim 1, wherein the wireless communications device transmits redirection data to the data network to cause data addressed to the wireless communications device and any other data processing devices previously connected to the local area network router may be redirected by way of the secondary network.

11. A process according to claim 10, wherein, on detection of recovery of the primary backhaul connection, the wireless communications device transmits redirection data to the data network to reverse the redirection instructions such that data addressed to the wireless communications device and any other data processing devices previously connected to the local area network router is transmitted by way of the primary backhaul network and the local area network router.

12. A wireless communications device comprising:
   means for wireless communication with a data network through a local area network router;
   means for receiving a signal from the local area network router to which the wireless communications device is currently wirelessly connected indicative that the local area network router has detected absence of a primary backhaul connection to a data network;
   means for communication with the data network through a second access point and a secondary network connection; and
   a store for wireless configuration identity data received from a local area network router, and for broadcasting the wireless configuration identity data for detection by other wireless-enabled devices in the event of loss of the primary connection;
   the wireless communications device being operable both as a user terminal and as a secondary access point to emulate the local area network router to route data traffic between other wireless communication devices, previously connected to the data network through the primary backhaul connection and the local area network router, using the wireless configuration identity obtained from the router to make connection to the data network through the wireless communications device and the secondary connection.

13. A wireless communications device according to claim 12, arranged to initiate the emulation in response to a message received from a local area network router with which it is in communication, indicative of absence of a primary backhaul connection to the router.

14. A wireless communications device according to claim 12, arranged to initiate the emulation in response to detection of a condition in which it has an address allocated by a local area network router but is unable to connection to a wide area data network through that local area network router.

15. A wireless communications device according to claim 12, arranged to respond to a condition in which an associated local area network router has no backhaul connection, by transmitting a shutdown signal to the local area network router to cause the local area network router to suspend transmitting its wireless configuration identity.

16. A wireless communications device according to claim 15 arranged to respond to a recovery signal from the local area network router indicative that a primary backhaul connection is available through the local area network router, by shutting down its operation as a second network access point and ceasing to broadcast the duplicated wireless configuration identity.

17. A wireless communications device according to claim 12, having a user interface, and arranged to generate an indication on the user interface that it is operating as a second network access point.

18. A wireless communications device according to claim 17, arranged to generate a prompt on the user interface in response to a signal from the first access device indicative of a loss of backhaul connection, and to initiate operation as a second access point in response to a user input following the prompt.

19. A wireless communications device according to claim 12, arranged to generate redirection data to cause data addressed to the wireless communications device and any other data processing devices previously connected to the local area network router to be redirected, and to transmit the redirection data to the data network.

20. A non-transitory computer-readable storage medium storing one or more computer programs operable in a wireless-enabled access point and arranged to implement the method as claimed in claim 1 by downloading instructions to one or more data processing devices.

* * * * *